(12) United States Patent
Chen

(10) Patent No.: US 7,104,675 B2
(45) Date of Patent: Sep. 12, 2006

(54) AUTOMOBILE ROOF GRIP AND LIGHT

(76) Inventor: Chang-Hua Chen, P.O. Box 90, Tainan City 70499 (TW)

(*) Notice: Subject to any disclaimer, the term of this patent is extended or adjusted under 35 U.S.C. 154(b) by 0 days.

(21) Appl. No.: 10/990,374

(22) Filed: Nov. 18, 2004

(65) Prior Publication Data
US 2006/0104072 A1 May 18, 2006

(51) Int. Cl.
*B60Q 1/26* (2006.01)
*B60Q 1/00* (2006.01)

(52) U.S. Cl. ............... 362/490; 362/488; 362/493
(58) Field of Classification Search .............. 362/490, 362/493, 488; 296/125; 16/444
See application file for complete search history.

(56) References Cited

U.S. PATENT DOCUMENTS 6,523,888 B1 * 2/2003 Yan et al. ................ 296/215
2005/0219854 A1 * 10/2005 Grady ..................... 362/490

* cited by examiner

Primary Examiner—Sandra O'Shea
Assistant Examiner—Anabel Ton

(57) ABSTRACT

An automobile roof grip and light includes a grip body and a light. The grip body has an elongate chamber in an intermediate portion, an elongate chamber hole formed in an inner sidewall, and a hole bored in one end of the chamber. An elongate cap closes on the chamber hole. The light device is deposited in the chamber, consisting of an elongate circuit board and plural LED on the circuit board. Then the grip and light can be used both as a grip and a light to be lit up for increasing brightness and also usable as a warning of showing a door being not yet closed.

3 Claims, 5 Drawing Sheets

AUTOMOBILE ROOF GRIP AND LIGHT

BACKGROUND OF THE INVENTION

1. Field of the Invention

This invention relates to an automobile roof grip and light, particularly to one having a transparent grip body provided with a chamber for depositing a light consisting of plural light emitting diodes (LED) fixed on an elongate circuit board. So when the light is not right enough in the inside of an automobile, the light in the grip can be lit up for increasing brightness, in addition to the original function as a grip. Moreover, the light can be used for a warning showing that the door is not closed yet.

2. Description of the Prior Art

A conventional automobile roof grip 1 shown in FIG. 1 is only used for gripping in case of an automobile swaying around for stabilizing a rider's position. Provided that light is not bright enough either in nighttime or in the place such as a basement, an indoor auxiliary light is lit up for looking for something or reading, but the auxiliary light is located in the center of the roof, a little too far from riders' seats to be bright enough to do so.

SUMMARY OF THE INVENTION

The Purpose of the invention is to offer an automobile roof grip and light, which can be useful for shining with enough brightness or for warning that the door is still not closed yet.

The feature of the invention is a transparent grip with an interior chamber for depositing a light consisting of plural LED fixed an elongate circuit board.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
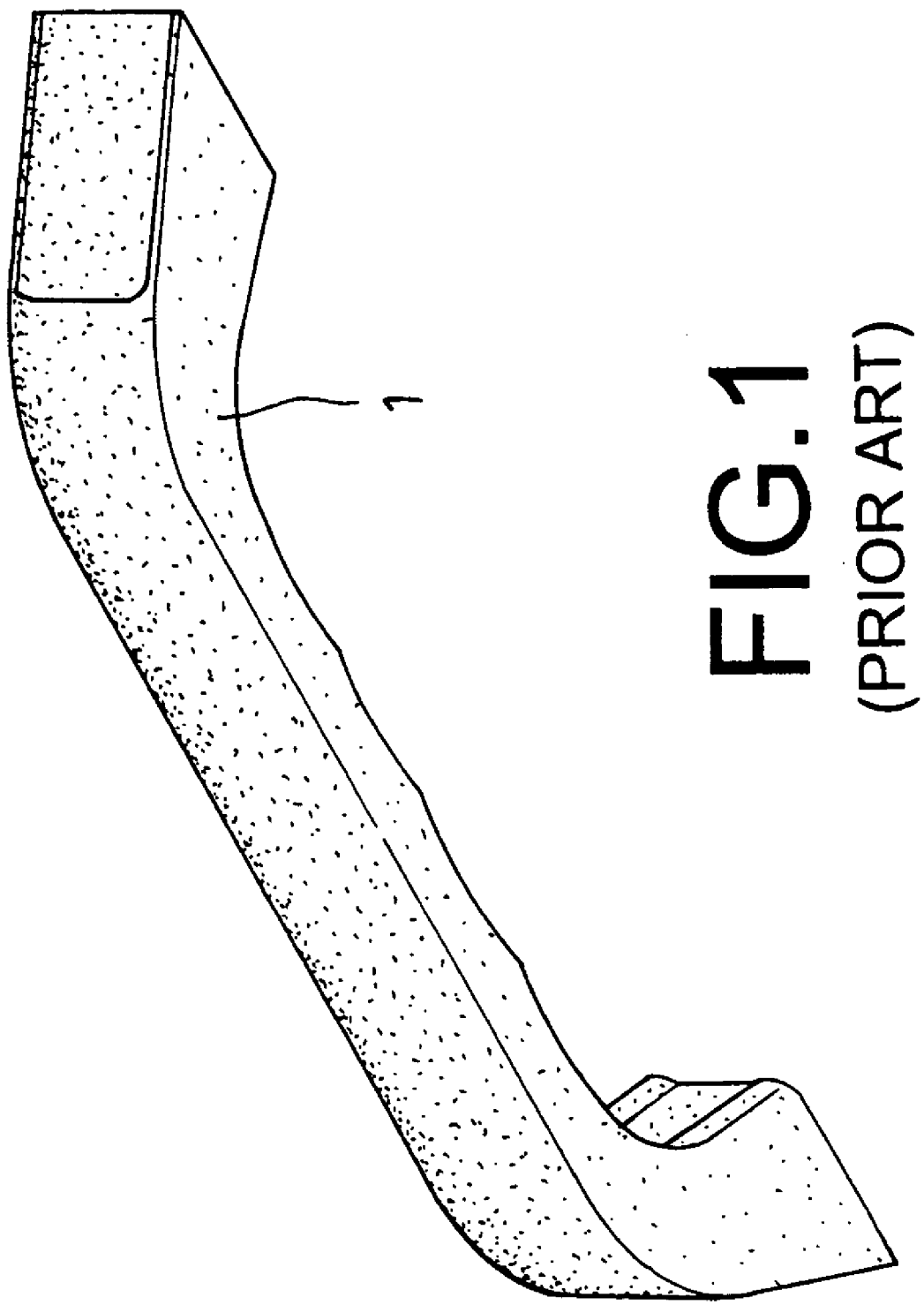
FIG. 1 is a perspective view of a conventional automobile roof grip.
Figure 2:
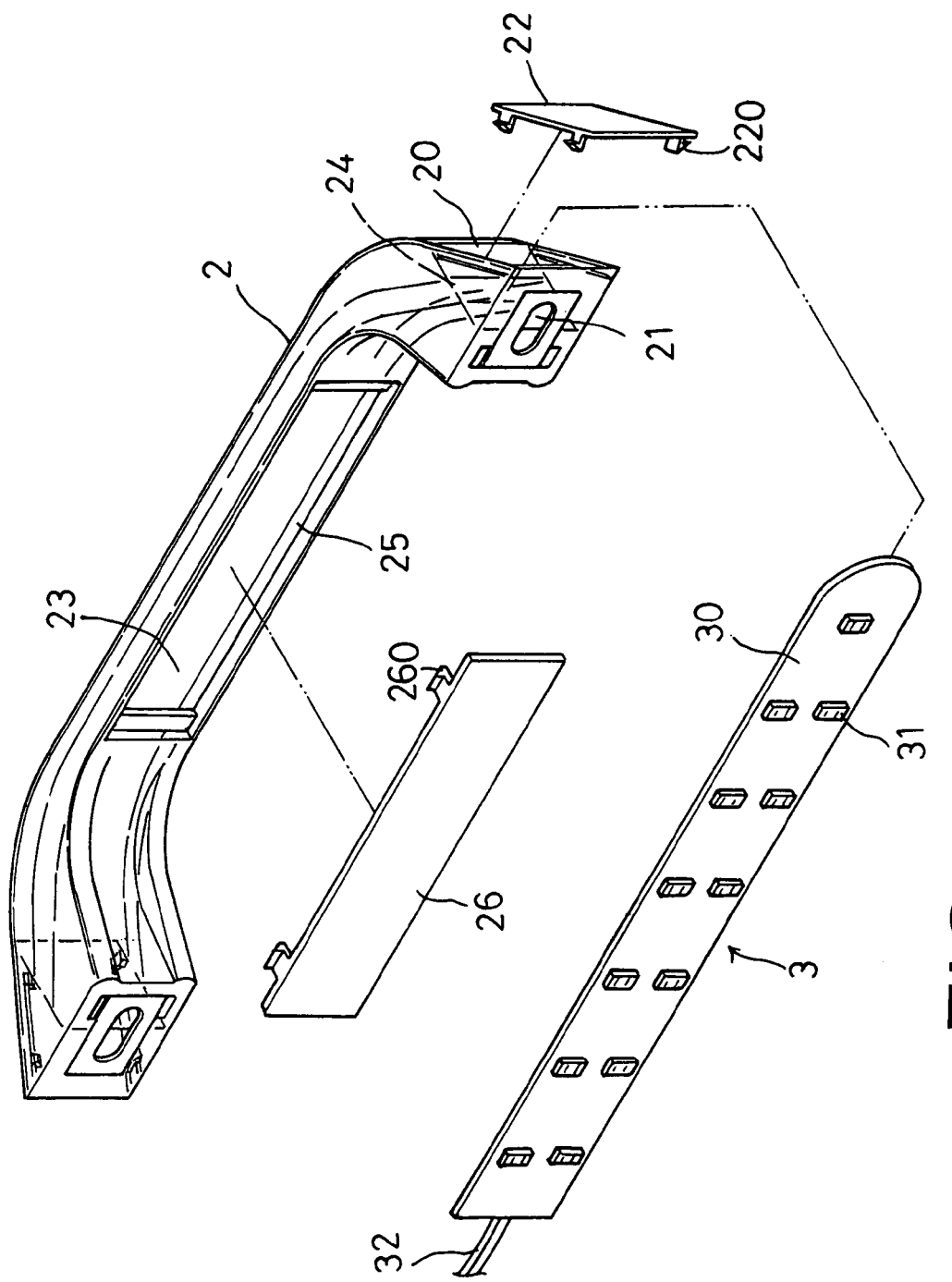
FIG. 2 is an exploded perspective view of an automobile roof grip and light in the present invention.
Figure 3:
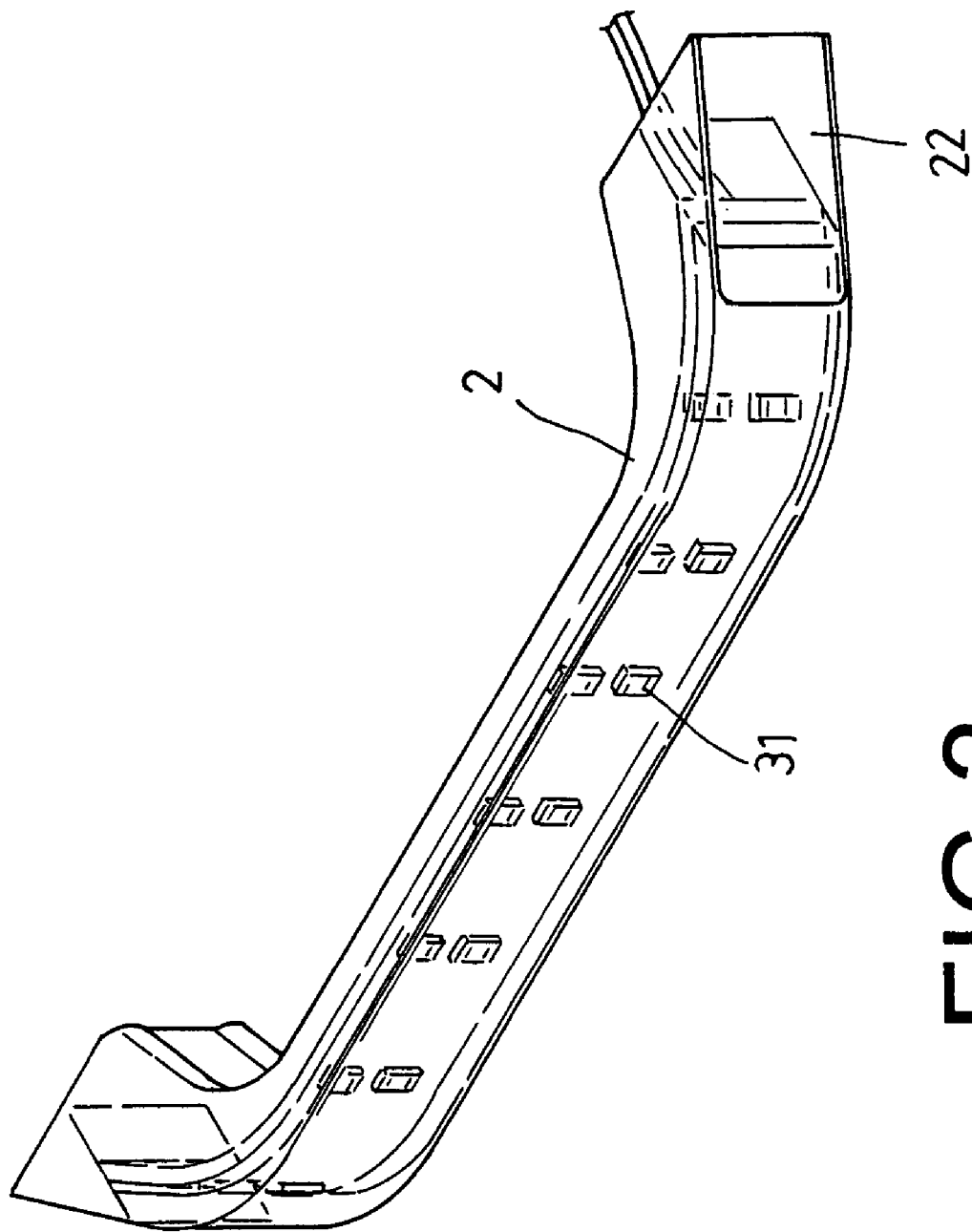
FIG. 3 is a perspective view of the automobile roof grip and light in the present invention.
Figure 4:
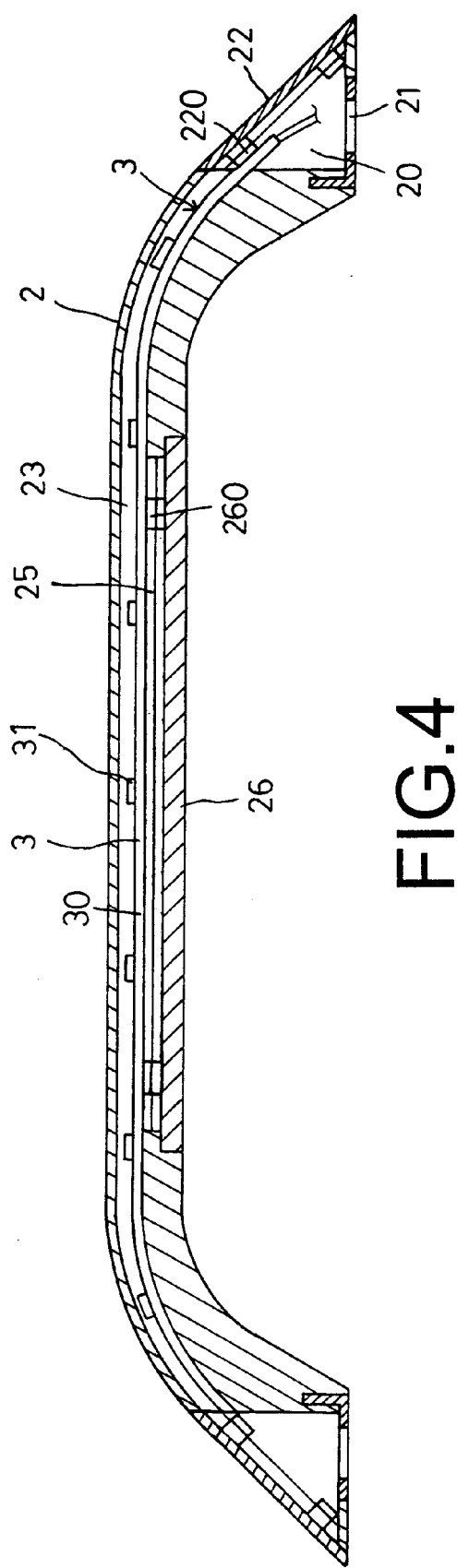
FIG. 4 is a perspective view of the automobile roof grip and light in the present invention.

A preferred embodiment of an automobile roof grip and light in the present invention, as shown in FIG. 2, includes a grip body 2 and a light 3 combined together.

The grip body 2 is made of a transparent material, having a recessed room 20 respectively in two side ends, a slot 21 in the bottom of each recessed room 20, and a side cap 22 closed on each recessed room 20. Each side cap 22 is provided with plural hooks 220 formed near four corners of an inner side to hook closely on the inner wall surface of each recessed room 20 to secure the side cap 22 stably at the closed position. The grip body 2 is further provided with an elongate chamber 23 in the intermediate portion, a hole 24 bored in one end wall of the chamber 23 and communicating with the chamber 23, and an elongate chamber hole 25 formed in the inner sidewall for a chamber cap 26 to close on. The chamber cap 26 is provided with plural hooks on the inner side for hooking closely on the inner wall of the elongate hole 25 to secure stably at the closed position.

The light 3 is deposited in the chamber 23 of the grip body 2, consisting of an elongate circuit board 30 and plural LED 31 fixed on the circuit board 30, electrically connected with wires 32 with a control device or a changeover switch in an automobile for turning on or out the light 3.

Figure 5:
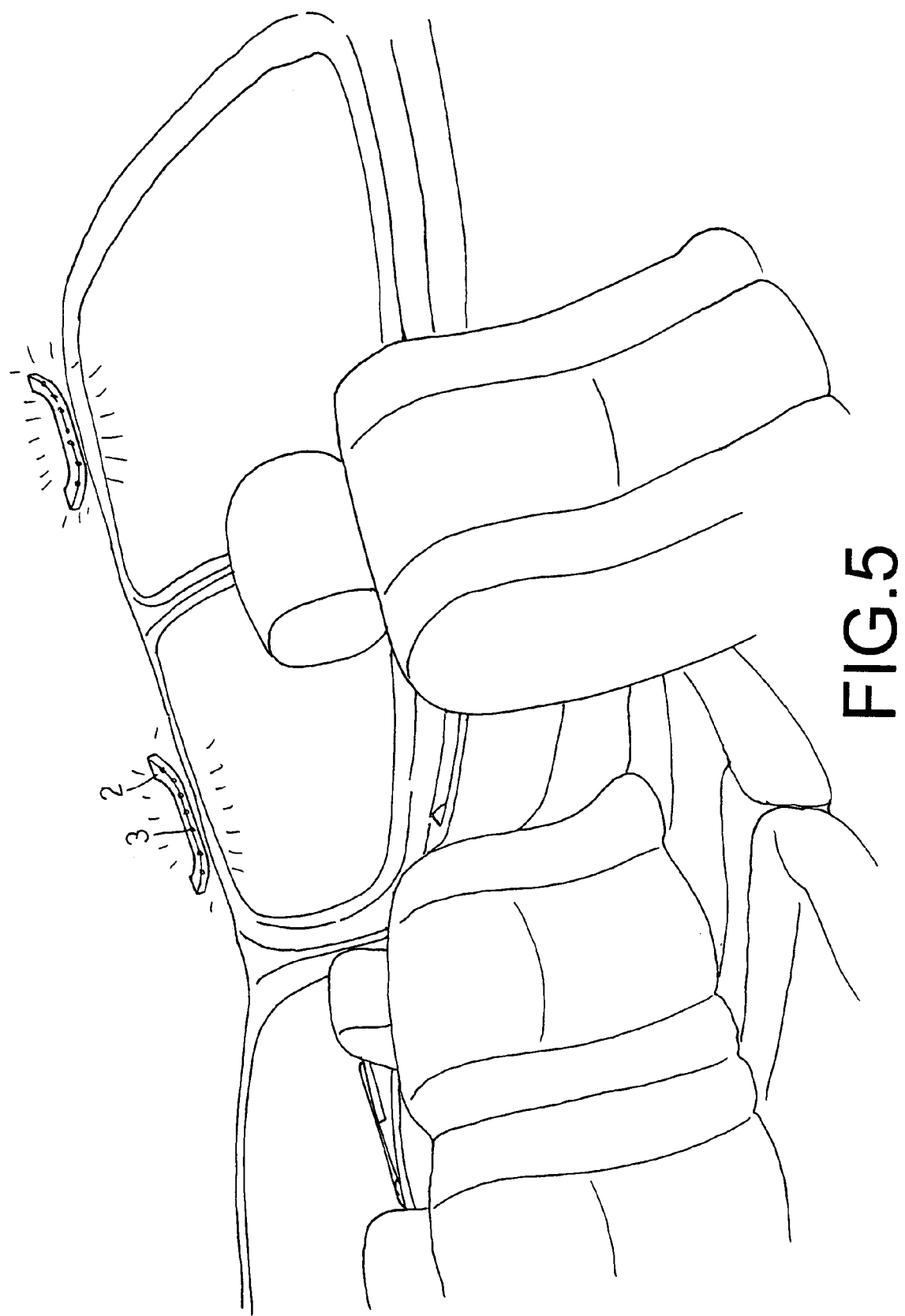
FIG. 5 is a perspective view of the automobile roof grip and light in the present invention, showing it being used.

In assembling, referring to FIGS. 2, 3, 4 and 5, the light 3 is inserted through the hole 24 at one side of the grip body 2 and placed in the chamber 23, and then the chamber cap 26 is closed on the elongate hole 25, with the hooks 260 hooking tightly on the inner wall of the hole 25 and also pushing the circuit board 30 stably in its position. Next, the slots 21 of the grip body 2 are aligned to the threaded holes of the car roof for screws to secure the grip and light on the roof. Then the two caps 22 are closed on the recessed rooms 20, with the hooks 220 hooking tightly on the inner wall of the inner wall of the rooms 20, finishing the assembly of the grip and light. When the brightness in the inside of a car is not enough, the light 3 can be lit up, as shown in FIG. 5.

The light 3 can be made to light flashing or fully, turning on and off regularly, if desired.

The invention has the following advantages, as can be understood from the foresaid description.

1. It can increase brightness inside an automobile.
2. The light consists of plural LED arranged on the circuit board, possible to be designed to light up flashing or fully and turned on and off intermittently and regularly for upgrading brightness and warning, for example:
    2-1. As a warning of opening or closing of the door,
    2-2. For shining the inside of the car if fully lit up.
    2-3. For indicating the location of the grip during nighttime.
3. It can be connected with a changeover switch or the control device in the car, for turning on and off, for handing and controlling of changing LED to be lit up, and for a driver to control handling, so as to increase convenience for use and practicality.

While the preferred embodiment of the invention has been described above, it will be recognized and understood that various modifications may be made therein and the appended claims are intended to cover all such modifications that may fall within the spirit and scope of the invention.

What is claimed is:

1. An automobile roof grip and light comprising:

a grip body (2) made of a transparent material and the grip body (2) having an approximate U shape with a long flat bottom portion and two symmetrical bending portion connected at two ends of the long flat portion; the grip body (2) being provided with an elongate chamber (23); said elongate chamber (23) extending between two ends of the U shape grip body (2) each of two ends of said chamber (23) having a hole (24), said grip body (2) having a chamber hole (25) in the long flat portion of the grip body (2), a cap (26) closing on said chamber hole (25);

a light (3) deposited in said chamber (23) of said grip body (2) and consisting of an elongate circuit board (30) and plural LED (31) fixed on said portions to the other one of said two symmetrical bending portions and thus the LEDs are distributed on the long flat bottom portion and the two bending portions;

said light possible to be lit up for shining the inside of an automobile when brightness in the inside is not enough, said light either used for increasing brightness or indicating a warning of a door being not yet closed;

wherein one outer lateral side of each bending portion of said grip body has a recessed room which has an opening on the lateral side of said bending portion, a cap is provided to close on said opening of each said recessed room, a slot is provided in a bottom of said recessed room for adjusting the location of a screw for aligning to the threaded hole of the roof of an automobile.

2. The automobile roof grip and light as claimed in claim 1, wherein said caps on said recessed rooms are respectively provided with plural hooks near four corners of an inner wall to hook closely on an inner wall of each said recessed room to be kept secured at the closed position.

3. The automobile roof grip and light as claimed in claim 1, wherein said cap on said chamber is provided with plural hooks formed on an inner wail to hook closely on an inner wall of said hole to be kept secured at the closed position.

* * * * *